United States Patent [19]
Amberg

[11] 4,184,309
[45] Jan. 22, 1980

[54] METHOD AND APPARATUS FOR ASSEMBLYING TUBULAR SLEEVE PREFORMS AND CONTAINERS

[75] Inventor: Stephen W. Amberg, Toledo, Ohio

[73] Assignee: Owens-Illinois, Inc., Toledo, Ohio

[21] Appl. No.: 930,306

[22] Filed: Aug. 2, 1978

[51] Int. Cl.² ............................................. B65B 13/00
[52] U.S. Cl. ...................................... 53/399; 53/585; 53/292; 156/86; 156/567
[58] Field of Search ................. 53/399, 459, 567, 585, 53/291, 292, 295; 156/86, 567, DIG. 14

[56] References Cited

U.S. PATENT DOCUMENTS

| | | | |
|---|---|---|---|
| 2,732,115 | 1/1956 | Allen | 53/459 |
| 4,032,388 | 6/1977 | Dunning | 156/567 |
| 4,118,915 | 10/1978 | Swenson | 53/291 |

FOREIGN PATENT DOCUMENTS 2327707  12/1973  Fed. Rep. of Germany ............. 53/292

*Primary Examiner*—John Sipos
*Attorney, Agent, or Firm*—E. J. Holler; M. E. Click; D. H. Wilson

[57] ABSTRACT

This invention relates to method and apparatus for producing a composite container having a neck label or tubular sleeve mounted temporarily thereon adapted to be shrunken into final surface covering position. The tubular sleeve is preformed of relatively-stiff material and flat-folded until ready for use when it is partially opened and conveyed into axial registry with a container therebeneath. The sleeve preform of heat-shrinkable plastic material is telescopically assembled onto the container while the latter is firmly retained at an upper region. The retention device for the container serves to both fully open the sleeve preform and align the preform and container into axial arrangement. A reciprocatable head contacts the preform while so retained and telescopes the preform at least partially over the container. After the retention device releases the container, a second reciprocatable head contacts the preform to more fully telescope the preform over the container to a finally-aligned position where it is then adapted to subsequent heat-shrinking in place in permanent conforming arrangement.

25 Claims, 15 Drawing Figures

METHOD AND APPARATUS FOR ASSEMBLYING TUBULAR SLEEVE PREFORMS AND CONTAINERS

BACKGROUND OF THE INVENTION

1. Field of the Invention

This invention relates to the manufacture of containers and primarily to the preliminary assembly of a hollow sleeve preform onto an upper extremity of a container for subsequent shrinking in situ thereon. The preform is taken from a stored, flattened condition to a position immediately above the container where it is fully opened into co-axial alignment with the container. The retention device for the container neck serves to fully open the preform and co-axially align the two components for their initial telescopic assembly. After such initial assembly with the container neck no longer retained, the preform is then finally assembled onto the container neck by further telescoping movement. The final shrinking of the preform onto the container, as can be performed by many appropriate physical conditions, is not part of this invention.

2. Description of Prior Art

This invention comprises an improvement over the methods and apparatus disclosed in issued U.S. Pat. Nos. 3,767,496, issued Oct. 23, 1973; 3,802,942 issued Apr. 9, 1974; and 3,959,065 issued May 25, 1976, all of which are commonly owned with the present application. In each of these disclosures, a tubular sleeve is formed which is telescopically assembled onto the article from below by a push-up mechanism. None of these disclosures pertain to a sleeve which is stored in flattened, prefabricated condition and then telescoped over the container in two stepwise, telescoping operations to permit efficient and rapid assembly.

In many of the previously-disclosed processes and apparatus for making composite containers having an integral plastic base or sleeve thereon, a manufactured glass bottle or jar is loaded onto a conveyor and preheated prior to mounting the plastic sleeve. The plastic sleeves carried on an underlying turret pass into alignment with the bottles and are moved vertically upwardly into telescopic assembly over the lower ends of the bottles. The sleeves are then carried on the bottles into a heating apparatus such as a tunnel oven wherein appropriate physical conditions shrink the sleeves into close-fitting conforming arrangement over the bottle surfaces where assembled. The heating apparatus commonly consists of a lengthwise oven through which the bottles are passed, the oven temperatures ranging from about 170° to 800° F., depending upon the plastic material selected to comprise the sleeves. U.S. Pat. No. 3,959,065, owned by the common assignee of this application, discloses method and apparatus which assure against dislocation of the sleeve on the bottle without external handling mechanism being required to hold the sleeve in place between its assembly point with the bottle and the shrinking oven.

The cap sealing of bottles has been conventionally performed in recent years to provide for reasons of sanitation, pilfer-proofing, safety and appearance, the further step of placing over and around the neck of the bottle, as well as preferably over at least part of its closure, a tubular sleeve of heat-contracting synthetic resin material, severed to a prescribed length, and then sealing the sleeve to the bottle by thermal contraction. The synthetic resin tubing is usually pressed flat and delivered in rolls in many production processes, and since the tubing may or may not stay fully flattened, particularly where it is comprised of extremely flexible and resilient material, inefficiencies can and do result when the severed lengths of tubing are fitted onto the bottle necks. In some cases, to facilitate the fitting of the short, flat, tubular sleeves onto the necks of bottles, it has been common practice to preform the sleeves such as by putting perforations or scores along their fold lines. It is also possible to apply the tubes around the bottle necks without preforming the material, as taught by U.S. Pat. No. 3,861,918 to Muto; however, such method requires the application of a bonding agent to the bottle neck for adherence of the sleeve. The method and apparatus disclosed by this patent are exceedingly more complex and prone to occasionally misapply a tubular band or label. U.S. Pat. No. 2,852,899 to Murrell discloses a collar feeding mechanism which is designed to remove only the lowermost collar from a nested stack by frictional engagement with its inner surface. The collars are preformed and nested tightly into a stack from which they are deliverable onto the container necks.

SUMMARY OF THE INVENTION

An object of this invention is to provide method and apparatus for positively opening flat-formed, tubular, blank sleeves of relatively-rigid material and placing the same telescopically over the top of the containers while both are held in axial alignment and subsequently moving the sleeve into further telescopic engagement over the container upper region while it is unsupported at the neck region.

The present invention is disclosed hereinafter in a specific preferred embodiment, provides both method and apparatus for applying a preformed, relatively-rigid tubular band or sleeve to an upper neck region of a container where it is frictionally retained prior to subsequent heat shrinking of the band onto the container into final conforming relationship. The invention permits telescopic assembly of the band onto the container upper region in two stages—the first while the container neck and band are held in co-axial alignment, and the second while the band is free-standing in partial telescopic arrangement on the container neck which is then unsupported. The bands formed of relatively-stiff material are stored in flat, folded condition in a stack with an open end lowermost adjacent a rotary turret adapted to retain the containers in spaced-apart relation. A pair of partible jaws having concave, cylindrical surfaces is adapted to both retain the container neck and fully open and align an individual band prior to placing same telescopically over the upper extremity of the container by a reciprocating head mechanism. The band is adapted to temporary retention in place on the container neck until it is heat shrunken into conforming, permanent relationship thereon.

The apparatus provides a rotary turret mechanism adapted to receive and retain a lower body portion of the container in spaced-apart container-receiving pockets. A rotary wheel mechanism having a series of vacuum heads thereon is arranged so that it conforms tangentially to a portion of the arcuate path of the rotary turret. The rotary turret has a partible jaw mechanism at each container-receiving pocket adapted to both retain the container neck and simultaneously open and align the tubular sleeve above the upper extremity of the container. The jaw mechanism permits precise axial alignment of a container neck and sleeve so that the sleeve is telescoped to an intermediate position on the container neck.

Another feature of the invention is a vacuum pick-up device capable of delivery of an individual tubular preform in partially opened condition from a nested stack of flattened preforms to a second vacuum device for further opening of the preform prior to its complete opening in circular alignment by the pair of partible container retention jaws.

A further feature of the invention is the provision of extended dwell time of the vacuum pick-up device adjacent the stack of flattened tubular preforms to assure delivery of an individual sleeve to the rotary turret even at accellerated rates of operation of the combined apparatus.

A still further feature of the invention is the two-stage telescopic movement of the tubular sleeve over the container neck while supported and then unsupported at said neck region for convenient and economical application thereof onto containers at production speed prior to heat shrinkage of the sleeve onto the surrounded circumferential surface area which sleeve may also provide a pilfer-proofing feature.

DESCRIPTION OF PREFERRED EMBODIMENT

Figure 1:
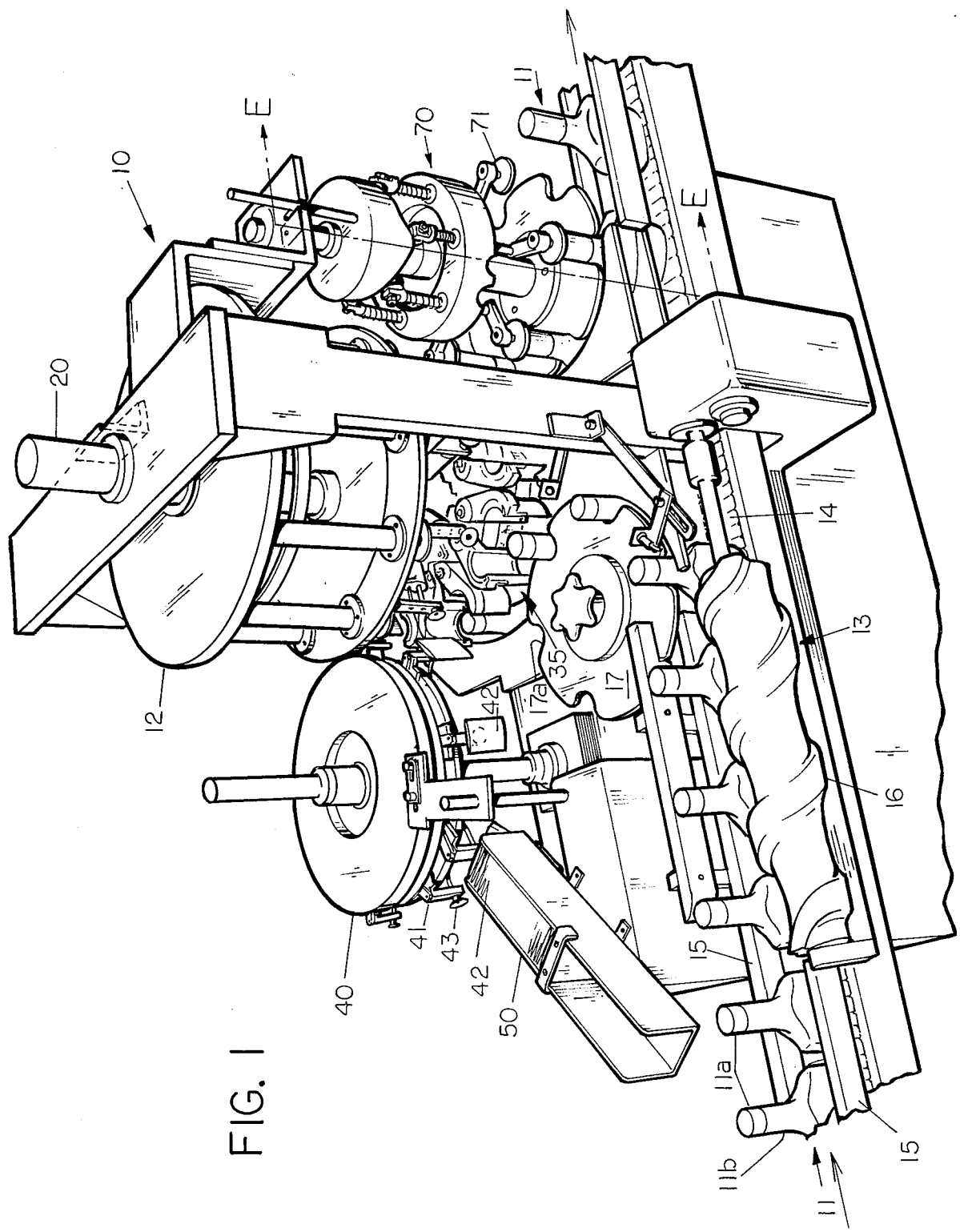
FIG. 1 is a front perspective view of a machine for applying plastic sleeves onto glass bottles incorporating the improvements of the present invention.

As shown in FIG. 1 of the drawings, the apparatus for producing containers with plastic sleeves thereon consists of rotary turret machine 10 which is adapted to receive and arcuately convey the containers 11 around at least a major portion of its full circumference. The containers 11 preferably consist of rigid, hollow, glass bottles which may or may not have a closure 11a thereon, thus being either in filled or unfilled condition, as desired.

As shown in FIG. 1, the containers 11 are delivered to the rotary turret 12 of the machine 10 serially in spaced-apart arrangement by a worm feed device 13 which is rotated in synchronism with movement of a linear conveyor 14. The conveyor 14 and worm feed device 13 are of the conventional construction adapted to convey the containers in upright position between a pair of parallel side rails 15. The worm feed 13 is designed to receive a lineal alignment of upright containers in physically-contacting, close relation and separate the same into equally-spaced arrangement for delivery to the rotary turret machine 10. Normally, the worm feed 13 has a continuous screw thread element 16 with a pitch distance generally complemental to the desired spacing of the containers for delivery to the turret machine. The axis of such thread element of the worm feed extends horizontally, the thread element replacing one of the conveyor side rails 15 for a limited distance.

The containers 11 are delivered by the worm feed 13 to a rotary starwheel 17 mounted between the conveyor 14 and the rotary turret 12 of the machine. The starwheel 17 has a stationary bottom plate on the same elevation as the conveyor 14 for sliding the containers 11 thereover. Starwheel 17 is mounted tangentially to both conveyor 14 and turret 12.

The containers are each received serially into a container-receiving pocket 18 on the rotary turret 12. The turret 12 has a plurality of equi-spaced pockets 18 extending around its circumference. The pockets 18 are capable of surrounding at least partially a major body portion of the container with a bottom support plate 19 for retaining each container in upright position. The plurality of pockets 18 on the turret 12 has peripheral spacing which coincides radially so that all pockets are equi-spaced. Support plate 19 is adapted to receive and support the container bottoms while the containers 11 are retained upright on the turret 12 and extends therearound immediately below the pockets 18. The pockets 17a in starwheel 17 are arranged to mesh with the container-receiving pockets 18 of the turret 12 at all speeds of machine operation.

Figure 2:
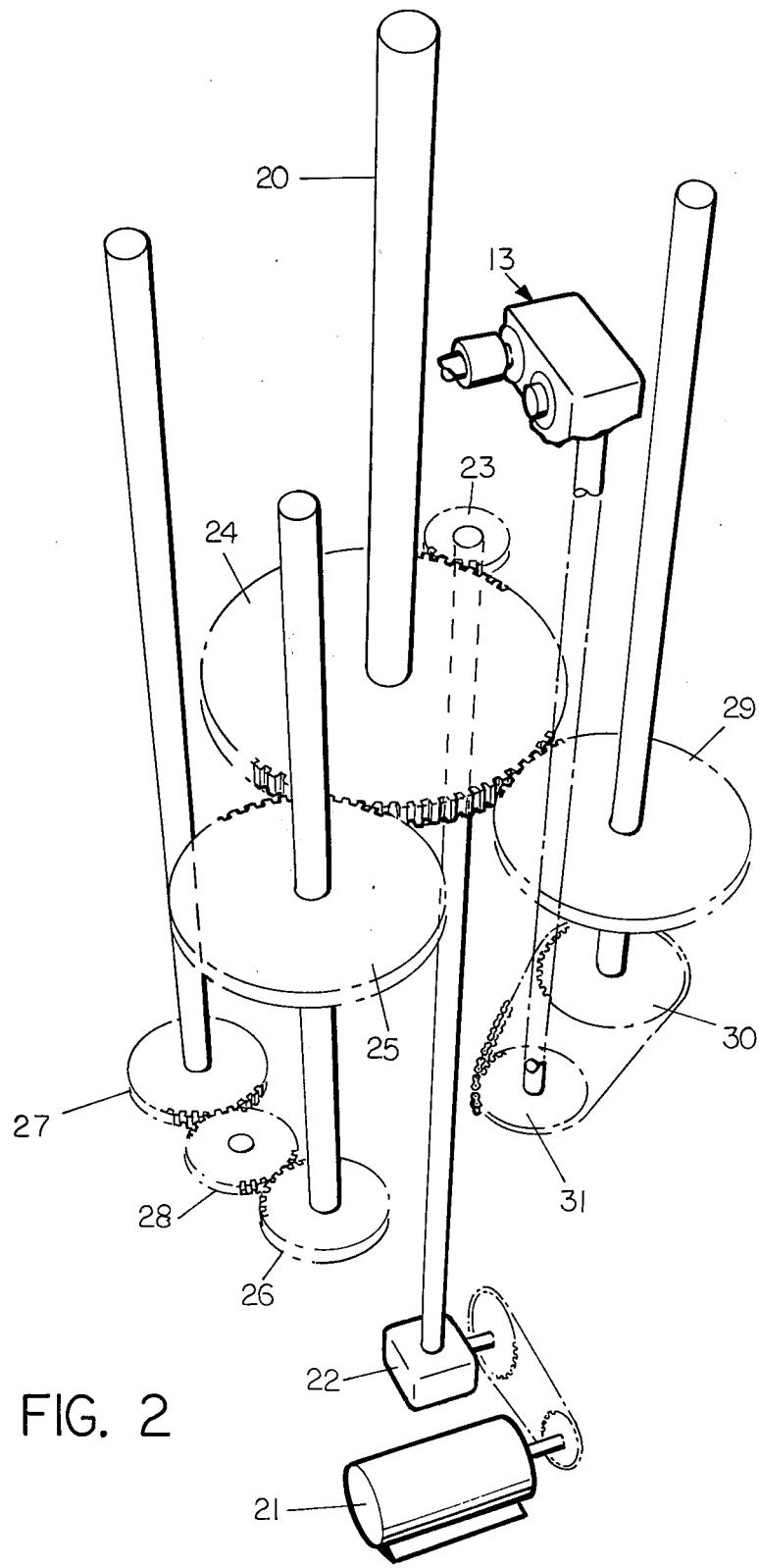
FIG. 2 is a schematic view of the power source elements of the machine of FIG. 1.
Figure 3:
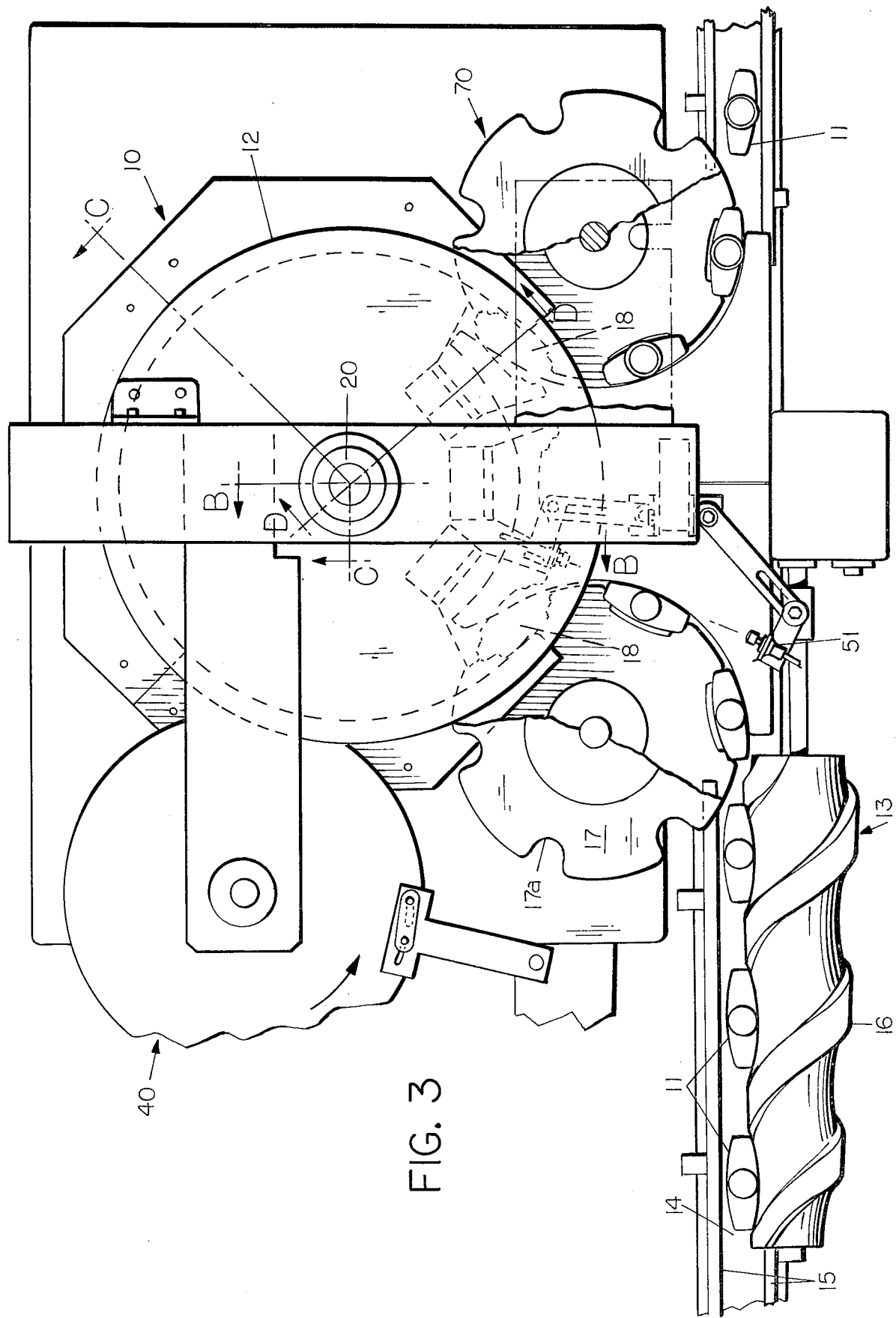
FIG. 3 is a plan view of the machine of FIG. 1 with the upper portions of the incoming and outgoing starwheels broken away.

The turret 12 is mounted on a central vertical shaft 20 which is rotated in conjunction with movement of the conveyor 14 and worm feed device 13. The turret 12 of the machine is rotated by an electrical motor 21 and gear box 22 engaging a pinion gear 23 through a suitable shaft which drives vertical shaft 20 of turret 12. All are located beneath the turret 12 as shown in FIG. 2. The main gear 24 of the turret 12 engages another gear 25 which drives incoming starwheel 17 through a suitable shaft. The starwheel shaft is connected to another gear 26 which drives still another gear 27 through an idler gear 28. Gear 27 is connected to a shaft which drives a rotary wheel device 40 for sleeve pick up and delivery. Yet another gear 29 interconnects with turret main gear 24 on a suitable shaft to drive outgoing starwheel 70. This shaft is connected to gear 30 which through gear 31 drives the gear box of the worm feed loading device 13. The gears and driving mechanism are shown schematically in FIG. 2.

The incoming starwheel 17 is mounted in horizontal tangential relation between the worm feed 13 and the turret periphery over a stationary horizontal plate to facilitate entry of the spaced containers into the turret pockets 18. Starwheel 17 has a plurality of recesses 17a therein adapted to move the containers slidably over a suitable dead plate aligned with bottom support plate 19 of the turret 12. When the starwheel 17 is rotated in synchronism with the worm feed 13 and turret 12, being powered by turret 12 as aforesaid, the containers are delivered serially upright in spaced relation from recesses 17a into the plurality of pockets 18 on the turret 12.

Figure 4:
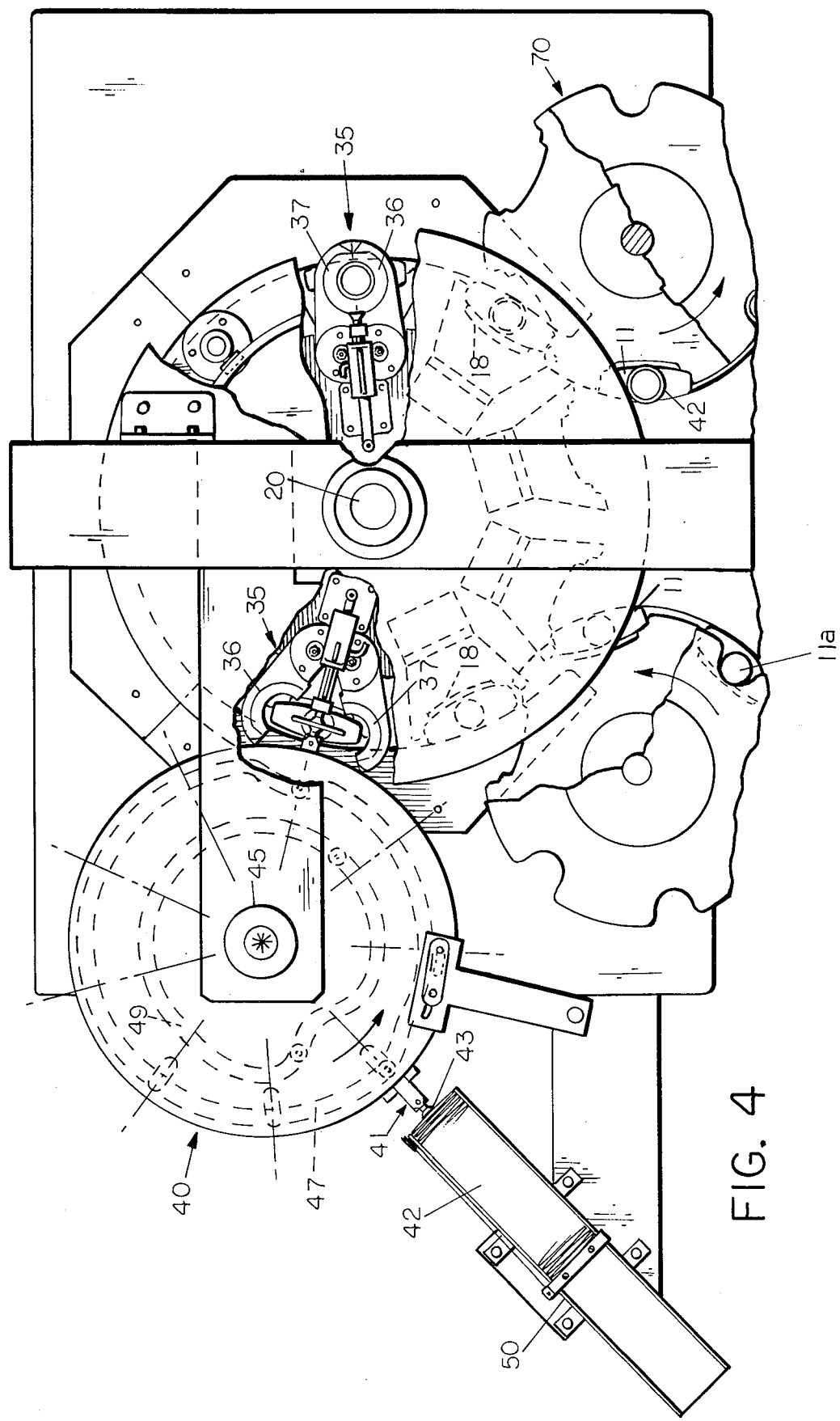
FIG. 4 is a top view of the machine shown in FIG. 3 with some portions of the main turret broken away, and others in broken lines, to illustrate the underlying details.
Figure 6:
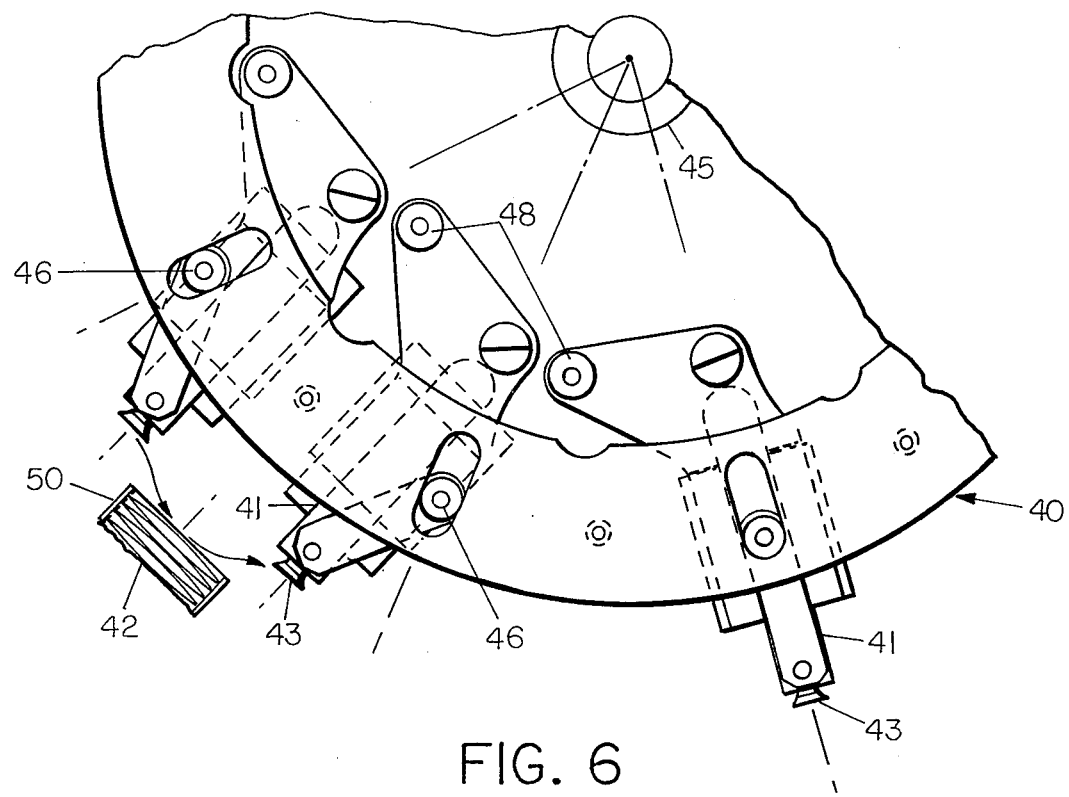
FIG. 6 is a partial top view of the vacuum pick-up and delivery device for the preformed sleeves with portions broken away.

Turret 12 has a plurality of partible chucking devices 35 located adjacent and immediately above each of the container-receiving pockets 18 and in vertical alignment therewith as shown in FIGS. 1 and 4. Each chucking device 35 consists of a pair of juxtaposed, concave, cylindrical jaws 36 and 37 which are adapted to physically contact and engage a portion of the container neck 11b while the container is disposed within pocket 18. The jaws 36 and 37 have an appreciable height extending generally co-extensive with the container neck 11b and closure 11a, surrounding the same when closed. The lower extremity of jaws 36 and 37 has a lesser diameter than the greater upper portion thereabove to permit the jaw pairs to engage the neck 11b at its lower region. The jaw pairs have a slightly greater internal diameter at an upper region complemental to the container neck 11b and closure 11a to facilitate firmly pushing a tubular sleeve downwardly in the annular space therebetween when the container neck 11b is firmly retained.

Figure 9:
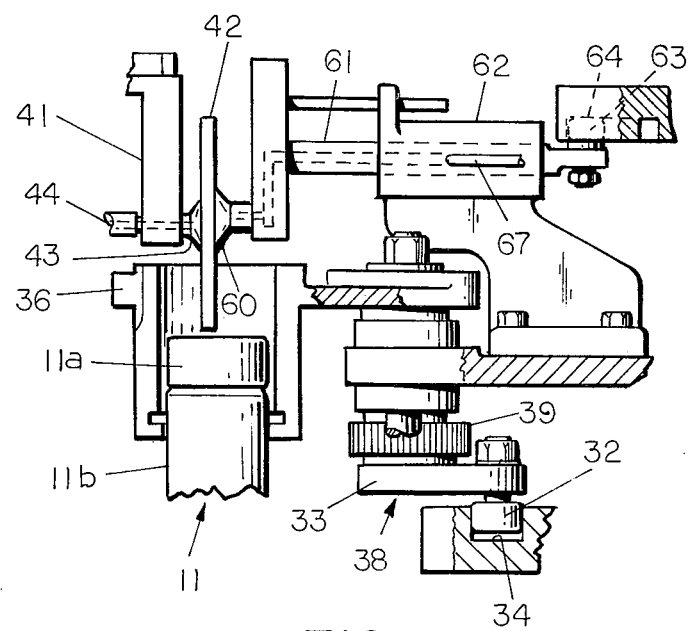
FIG. 9 is a sectional view taken along the line A—A of FIG. 8.

Each of the chucks 35 is thus comprised of a pair of matching concave semi-cylindrical jaws 36 and 37 which are pivotally mounted and adapted to firm engaging contact with a container neck. The turret 12 possesses suitable camming mechanism 38 to swing the jaws closed around the container neck 11b immediately following entry of a container into a turret pocket 18. As shown in FIG. 9, the mechanism consists of a pair of small gears 39 with each one mounted on a shaft connected to an upper region of each jaw assembly 36 and 37, the gears adapted to interengage with each other for jaw closing and opening. One of the gears 39 of each pair has a rigid arm 33 connected thereto which has a cam roller 32 on the other end which moves within a cam track 34. Thus, when cam roller 32 turns the arm 33, the meshed gears 39 are rotated to close and open the pair of jaws 36 and 37. Thus, upon entering the turret, the body portion of the container is loosely held in pocket 18 and the neck portion more rigidly held by the jaws 36 and 37 of the chucking device when closed.

Figure 8:
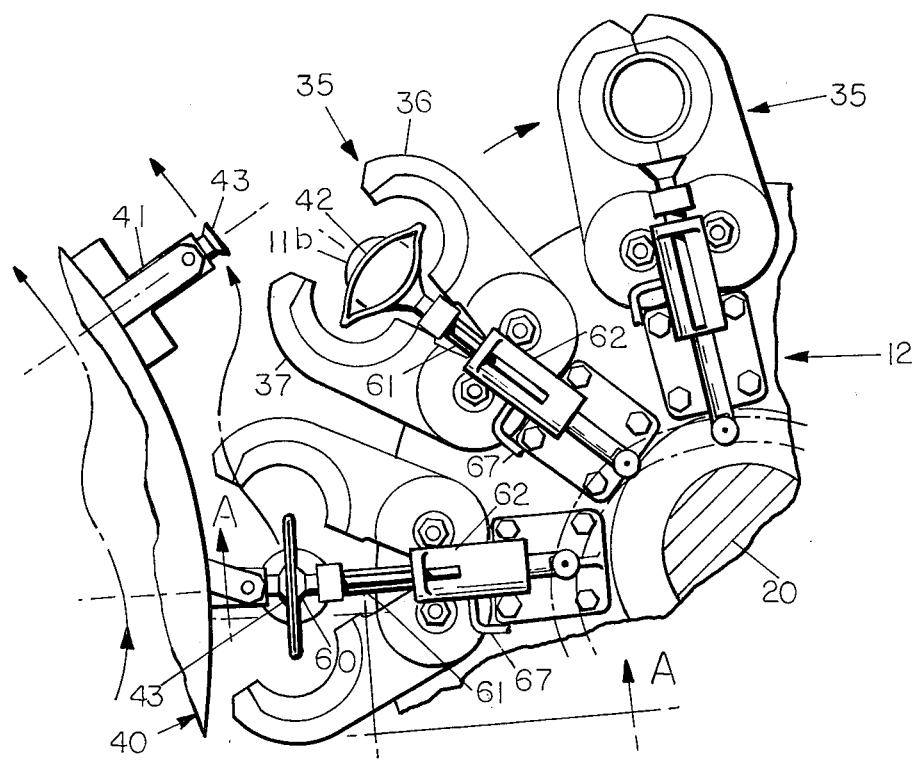
FIG. 8 is a fragmentary top view of several pairs of partible jaws of the main machine turret.

A horizontal wheel device 40 is mounted closely adjacent and in tangential relation to the turret 12, as shown in FIGS. 1, 4 and 8. The wheel device 40 carries a plurality of first vacuum heads 41 in equi-spaced, radial alignment, the heads facing outwardly for engagement with a nested stack of preformed tubular sleeves 42 and their delivery to turret 12. Each of the heads 41 comprises a vacuum cup 43 mounted vertically connected to a vacuum line (not shown) which interconnects with a rotary vacuum manifold 45 at the center of the wheel. Each of the heads 41 is mounted on a suitable slide extending radially from the wheel center and is adapted to extended and retracted movement of the head by a first camming mechanism 46. Camming mechanism 46 moves within a first cam track 47 extending around the wheel 40. A second camming device 48 is also connected to each head 41 which moves within a second cam track 48 on the wheel, the cam tracks being shown in FIG. 4. The second camming mechanism 48 provides an extended dwell time of the vacuum cup 43 when facing outermost sleeve 42 at the retained stack. Normally the vacuum cup 43 is moved radially outwardly by the first camming mechanism 46 at the sleeve pick-up position and maintained in such position until delivery of the sleeve to the machine turret. The second camming mechanism 48 serves to swing the head 41 through an arc with the cup 43 being delayed in passing the pickup position so that greater dwell time is achieved thereat. Thus, positive pick-up of an individual sleeve by the vacuum cup 43 is ensured even at rapid rates of machine operation. Cup 43 thereby is maintained in facing alignment with the outermost sleeve 42 in the nested stack for a longer period.

Figure 5:
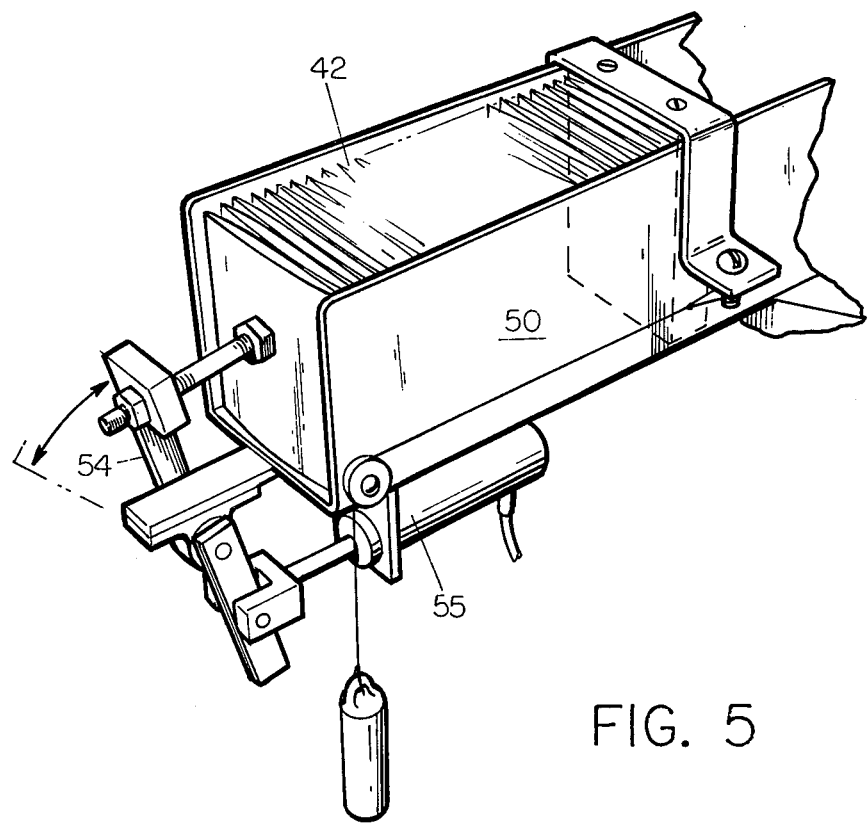
FIG. 5 is a partial perspective view of the magazine device for holding a substantial number of preformed sleeves.
Figure 7:
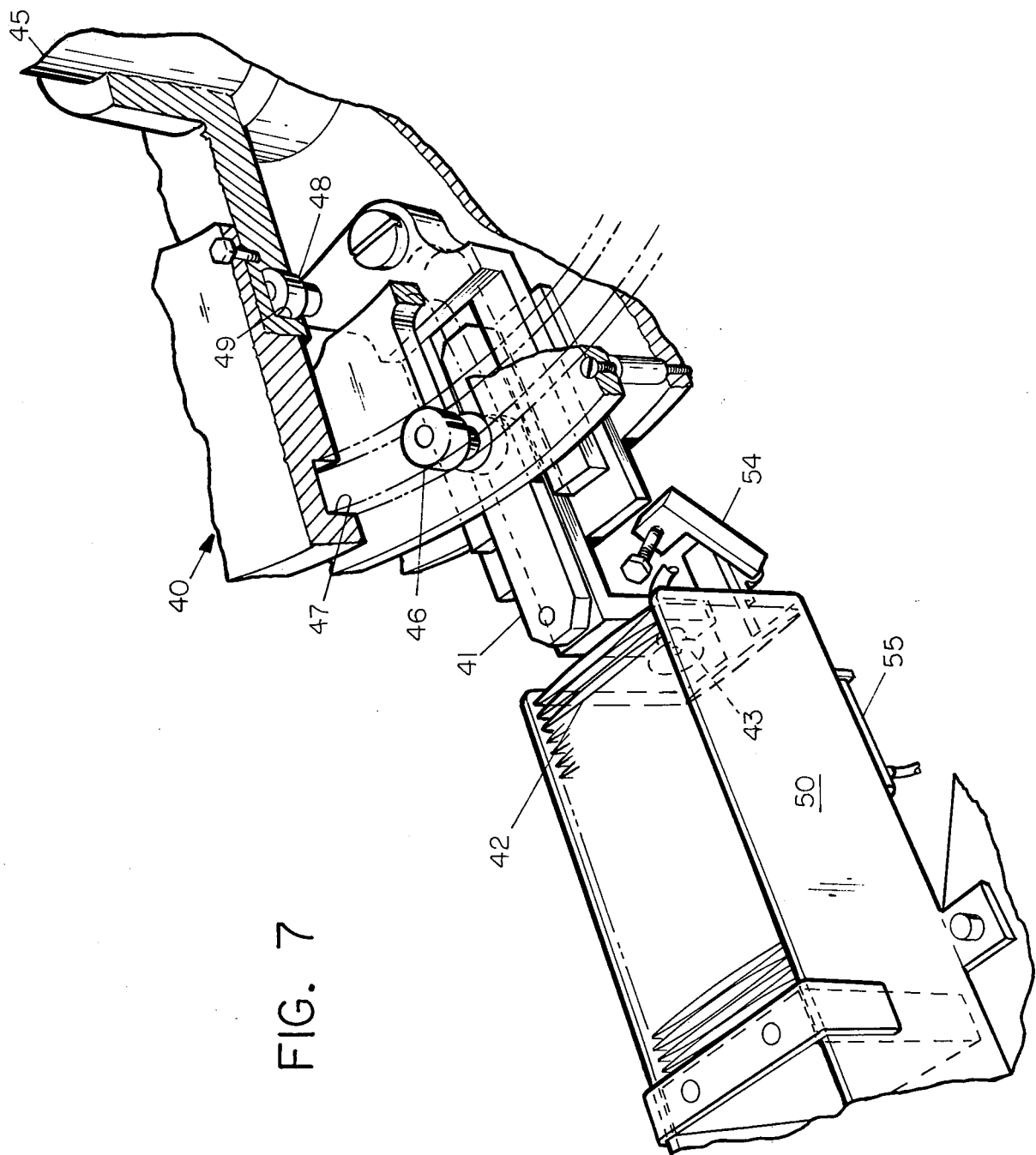
FIG. 7 is a partial perspective view of the magazine device and vacuum pick-up and delivery device shown in FIGS. 5 and 6 with portions broken away.

The stack of sleeves 42 is held in a suitable holder 50 having dimensions closely complemental to the retained, nested stack of sleeves. The holder is slightly smaller at the sides of its exit area. The sleeves 42 are uniformly and tightly aligned vertically with an open end lowermost in the stack, as shown in FIGS. 5 and 7. The sleeves are retained tightly enough in the holder 50 so that vacuum cup 43 must exert some pulling pressure on the outermost sleeve to pull it from the restricted exit area of the holder and in so doing partially opens the sleeve. The cup 43, by action of second camming mechanism 48, is delayed in passing the pick-up point when nearest to and facing the outermost sleeve 42 to ensure positive engagement therewith even at high rates of rotation of wheel 40. Thus, each cup 43 is able to positively engage an upper region of a flat facing surface area of the sleeve 42 to carry the same through an arc into tangential relation with the machine turret 12. A vacuum line extends from a central vacuum manifold 45 at the center of wheel 40 to each vacuum cup 43 mounted on head 41. Thus, negative pressure is maintained on the face of each cup 43 during operation of the machine. The vacuum wheel 40 and turret 12 are interconnected through starwheel 17 by interlocking ring gears therebeneath so that each of the vacuum cups 43 is moved into precise facing alignment with a container pocket 18 to permit delivery of a partially opened sleeve 42 to a position at least partially above and within an expanse of an open pair of partible jaws 36 and 37.

The sleeves 42 are preferably comprised of foamed, medium-impact polystyrene having a wall thickness ranging from 0.005 to 0.020 inch. The material has a preferred density of 2 to 30 pounds per cubic foot with the primary orientation extending in a circumferential direction around the preformed sleeves. The preformed sleeves are relatively-rigid or semi-rigid having a stiffness in Taber units of 22 to 26 around the sleeve circumference, and 7 to 11 in the axial direction of the sleeve. Taber units are a well known measure of stiffness used in the paper industry.

A photoelectric cell device 51 is mounted facing the pockets 17a of starwheel 17 adapted to load the pockets 18 of main turret 12. This device is employed to detect the presence of a container 11 in each of starwheel pockets 17a. Device 51 is interconnected to an electrically-operated hydraulic cylinder device 55 having an arm 54 facing the outermost sleeve 42 of the retained, nested stack in the holder 50. When device 51 indicates that a container 11 is not being delivered to the main turret 12, arm 54 operates upwardly by the small hydraulic cylinder and piston rod assembly 55, as shown in FIG. 5. The arm 54 then positively retains the outermost sleeve so that the vacuum is broken when cup 43 contacts the sleeve outermost surface. Thus, a sleeve 42 is then not delivered to turret 12 in the absence of a container.

A second vacuum cup 60 is mounted in reciprocatable, vertical relation on the turret 12 immediately above each pair of jaws 36 and 37 and in alignment therewith. The first vacuum cup 43 brings a sleeve 42 into facing alignment with the second vacuum cup 60 and the jaws. Such second cup contacts the opposite side of the sleeve then held vertically by cup 43 to pull the sleeve apart and more fully open. Cup 60 is mounted on a horizontal piston rod 61 which is moved within a stationary slide block 62 on the turret, as shown in FIG. 9. A vacuum line 67 connects with second vacuum cup 60 through slide block 62. A cam roller 63 is mounted on the inner end of rod 61 which roller operates within a cam track 64. A rod 61 extends the cup 60 to its fully-extended position as the cup 43 approaches the partible jaws of chucking device 35. An individual sleeve 42 is thus carried a short arcuate distance by the two cups 43 and 60 contacting opposite exterior surfaces of the sleeve. At this time, the second cup 60 is retracted by piston rod 61 to cause the sleeve to be more fully opened between the cups.

Figure 10:
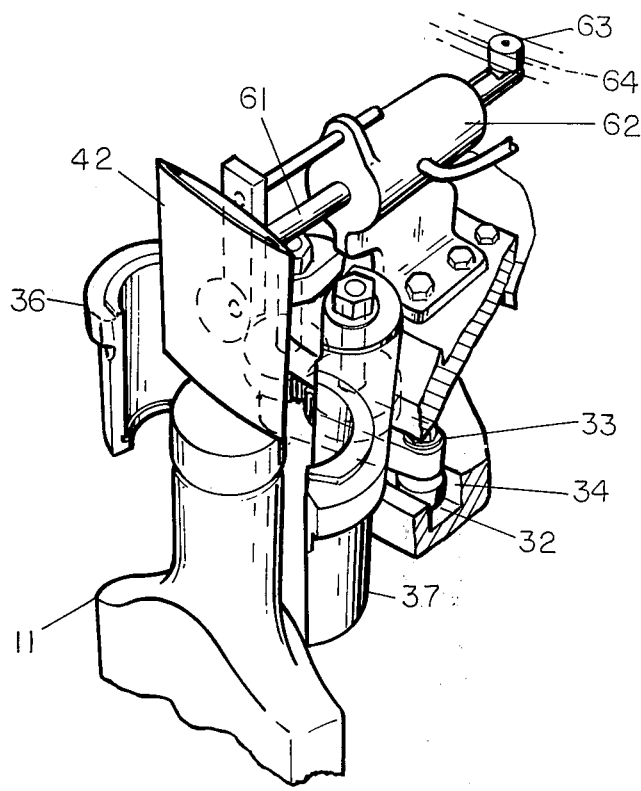
FIG. 10 is a partial perspective view of a single pair of partible jaws and container at one container-receiving station of the machine with the jaws open, and container and sleeve in place.
Figure 11:
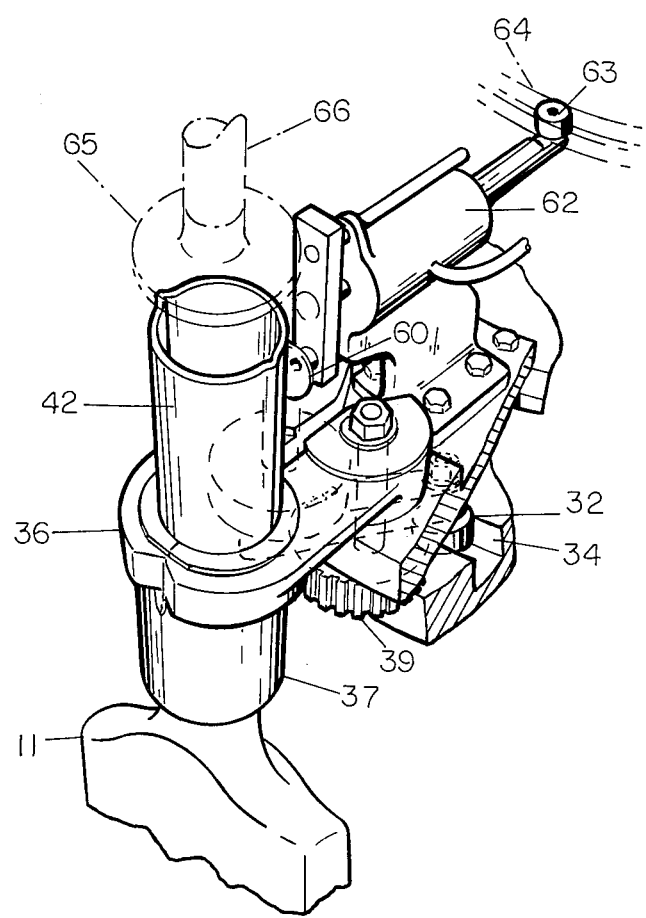
FIG. 11 is a view similar to FIG. 10 showing another container-receiving station of the machine with the jaws closed around the container and the sleeve fully opened.

The sleeve 42 is delivered partially open by the juxtaposed vacuum cups within the confines of an open pair of jaws 36 and 37 which also at least partially surround a container 11 held loosely in the container-receiving pocket 18. This is shown in FIG. 10. Immediately following delivery of the sleeve 42 within open jaws 36 and 37, the jaws are swung pivotally closed by camming device 38 to engage both the container neck region 11b and to simultaneously fully open the sleeve 42. FIG. 9 has the near gear 39 removed to show the rear gear and arm 33. The fold lines of the partially open sleeve 42 are then positioned facing the concave jaw surfaces so that closing the jaw presses the fold lines together and forms the sleeve sides into semicylindrical configuration. This is shown in FIG. 11. The sleeve in circular configuration is then fully retained by the slightly-larger, internal diameter of the jaw cylindrical surfaces in a position just above the container closure 11a or the container top extremity when uncapped. The internal diameter of the jaws is designed to be closely complemental to the sleeve diameter to permit fully opening the sleeve therewithin and vertically sliding the sleeve downwardly in the intermediate annular space between jaws and container neck. The jaw surfaces are preferably smooth and continuous to permit such sliding contact.

Figure 13:
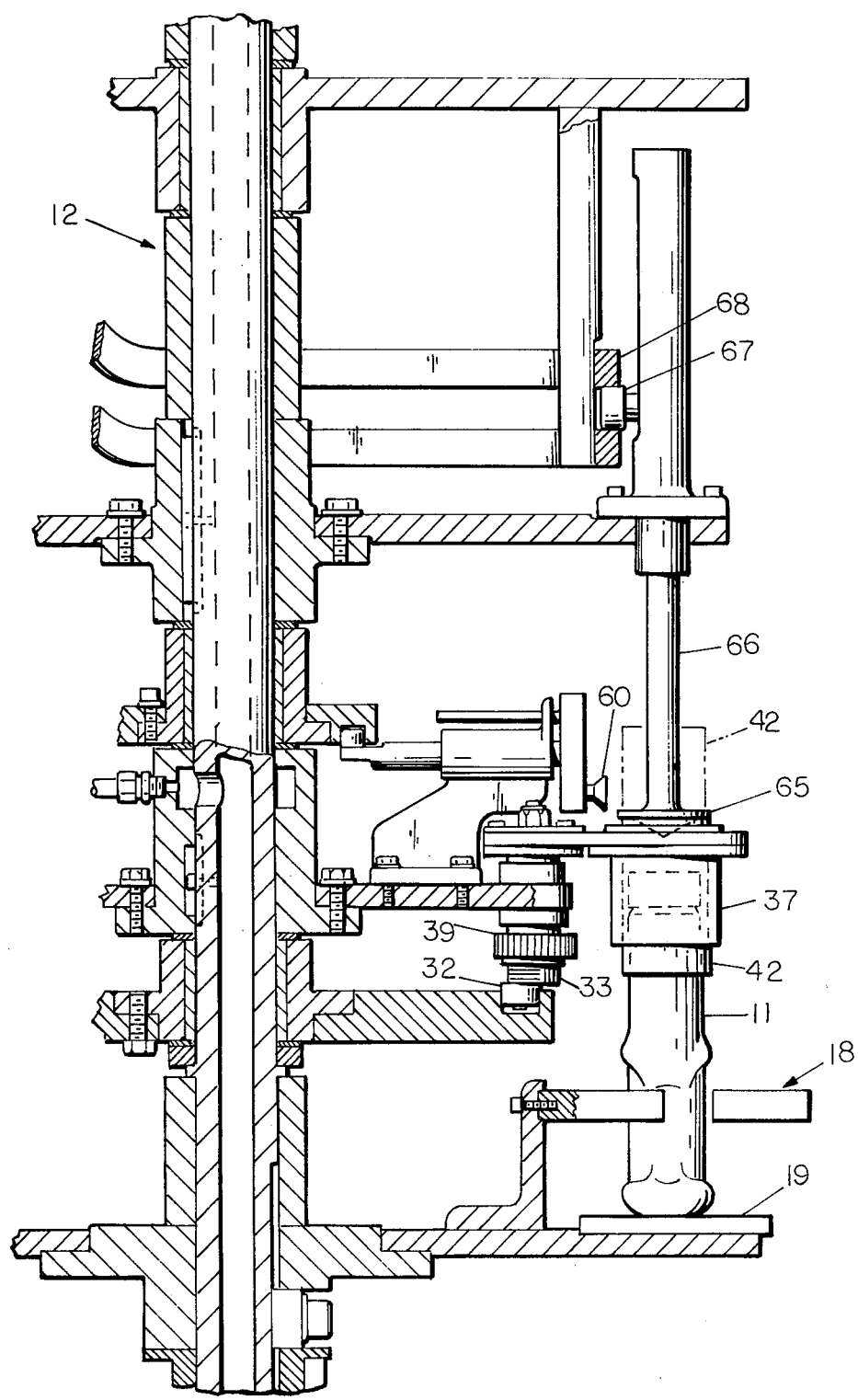
FIG. 13 is a fragmentary sectional elevational view taken along the line C—C of FIG. 3.

Immediately following the jaw closing, an overhead reciprocatable first alignment plate 65 which is preferably flat and circular having a diameter slightly greater than sleeve 42 is cammed downwardly to cause the sleeve 42 to be telescoped over the upper extremity of the container 11 and closure 11a when present within the closed jaws. The sleeve is lowered by the flat surface of plate 65 contacting the upper surface of the sleeve 42 which moves it downwardly in an axial direction. A similar plate 65 is mounted above each pair of partible jaws 36 and 37, extending normal to the jaw working surfaces. Plate 65 is arranged in centered relation over the closed jaws so that when second vacuum cup 60 is fully retracted, and the sleeve fully opened by the jaws, the plate is capable of positive downward movement lowering the sleeve axially within the jaws to a lowered region with said jaws acting as guides for the sleeve where the sleeve bottom either contacts or is adjacent the jaw portions engaging the container neck 11b. This is shown in FIGS. 11 and 13.

Figure 12:
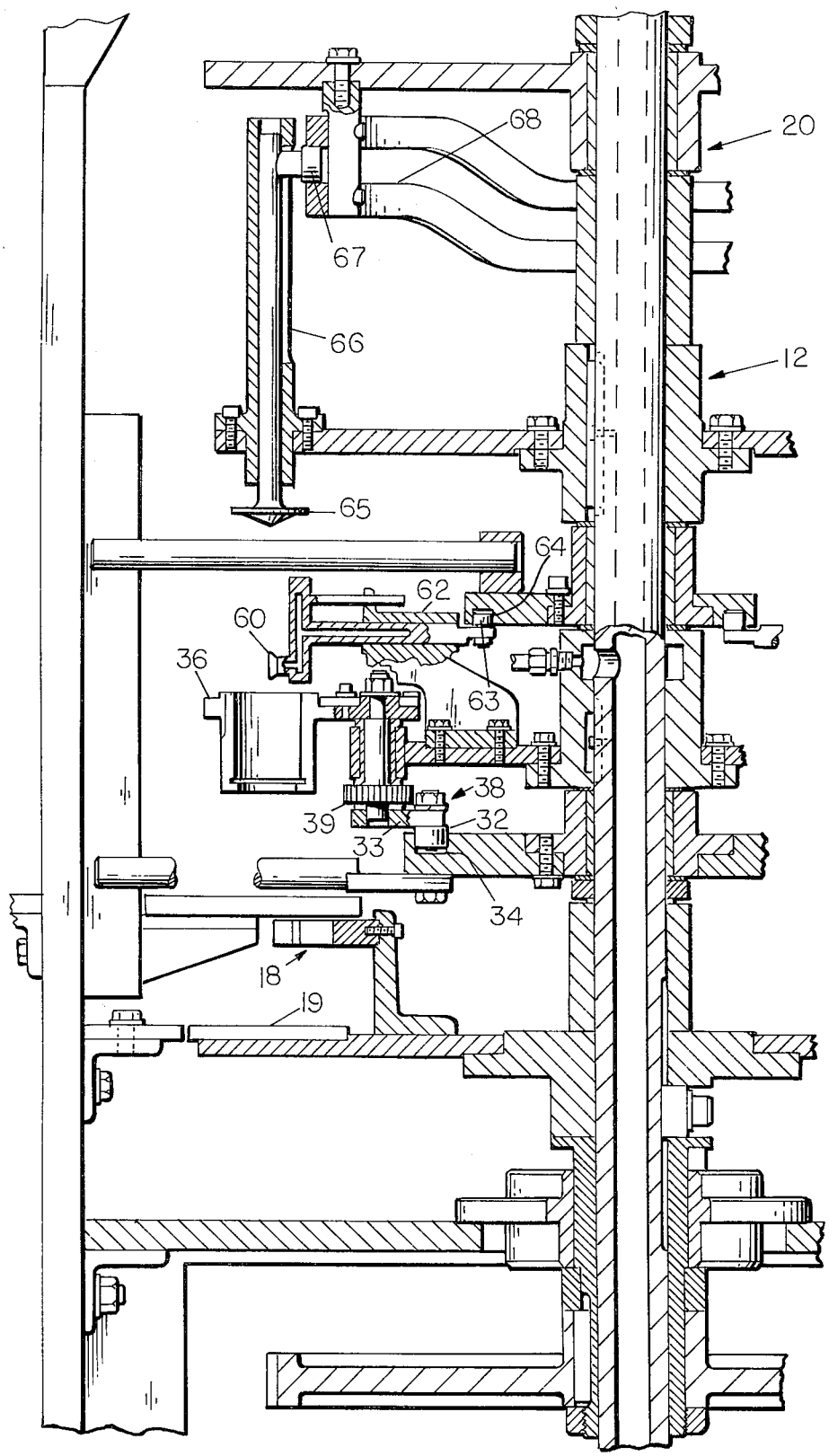
FIG. 12 is a fragmentary sectional elevational view taken along the line B—B of FIG. 3.
Figure 14:
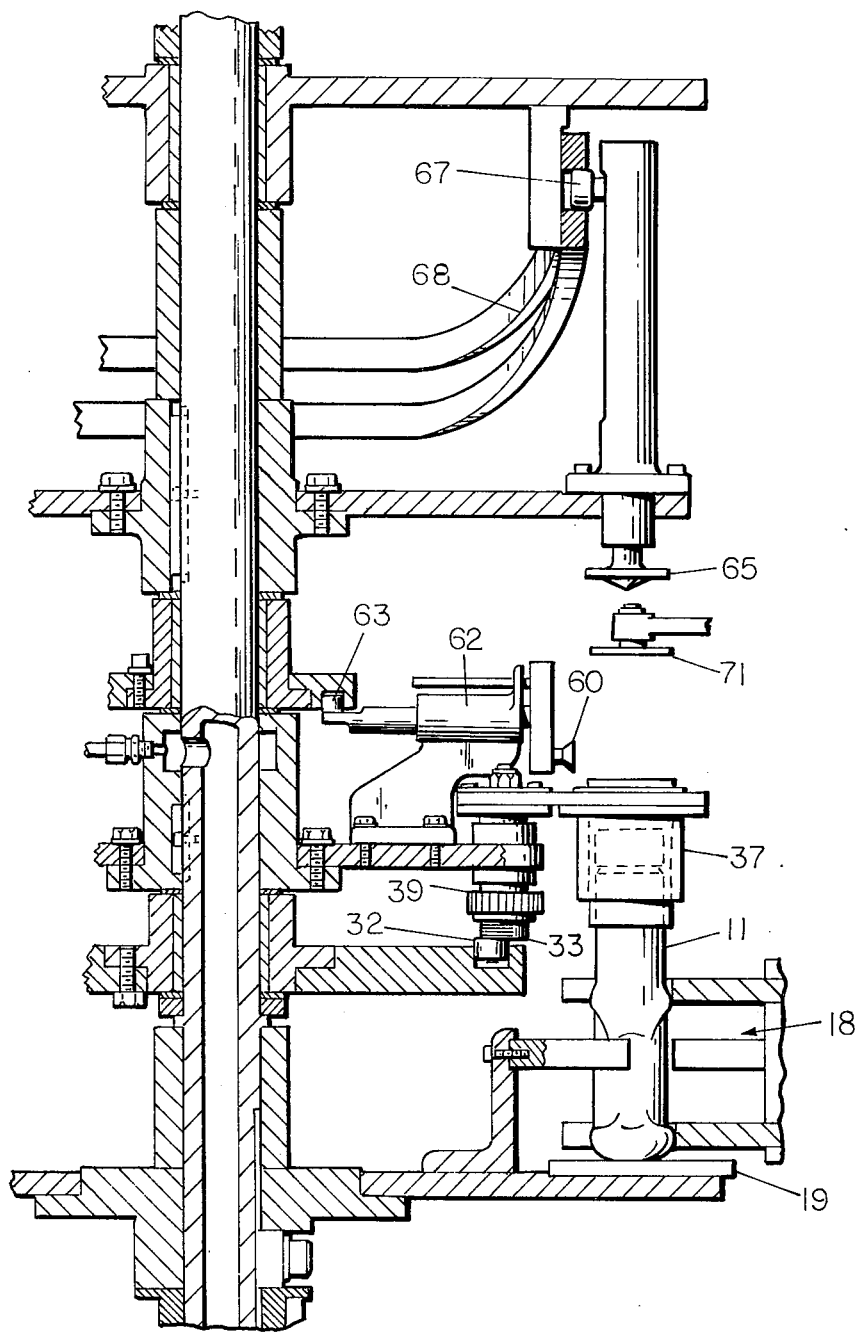
FIG. 14 is a fragmentary sectional elevational view taken along the line D—D of FIG. 3.
Figure 15:
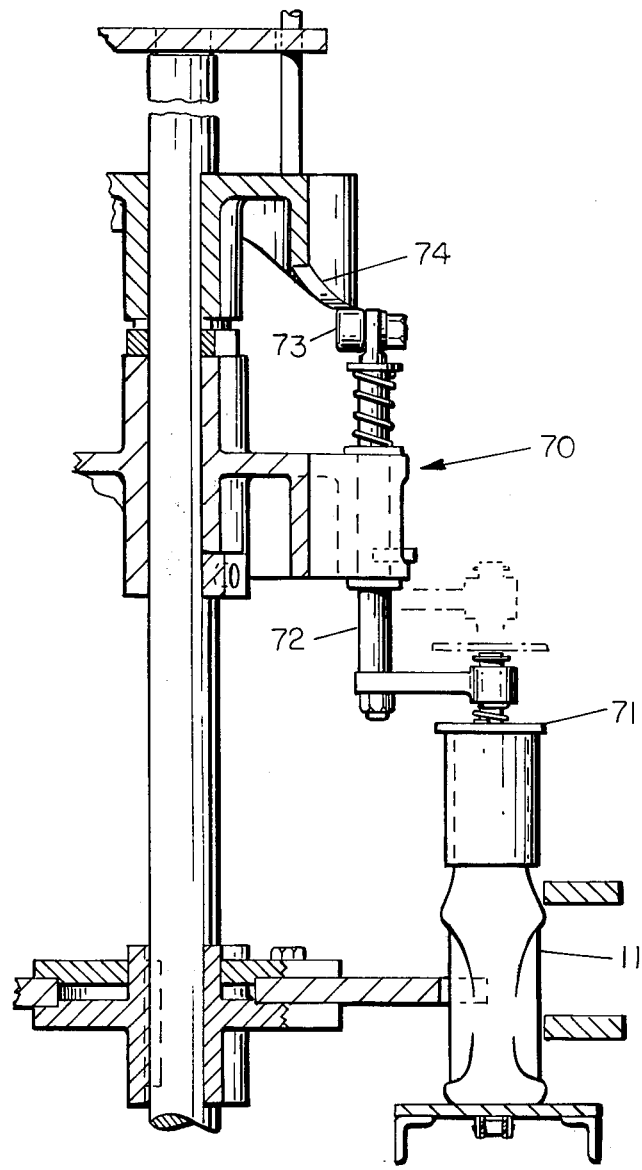
FIG. 15 is a fragmentary sectional elevational view taken along the line E—E of FIG. 1.

The plurality of flat plates 65 is each mounted on the lower end of a vertical rod 66 which is spring loaded to be held normally in a raised position. This is shown in FIGS. 11 and 12. The rods 66 each have a roller cam 67 mounted on an upper portion which cam is moved in a cam track 68 by rotation of turret 12. The plates 65 are each moved by the cam track to lower the rod and thus the sleeve 42 into an annular space between jaws and container neck. This is shown in FIG. 13. The cam track 68 extends in a circular arrangement completely around an upper area of the turret 12 so that plates 65 are moved downwardly during an interval when the jaws 36 and 37 are closed and a sleeve is in an upper aligned position. This is shown in FIG. 14. The plates are moved upwardly when the jaws are opened.

After the sleeve 42 is fully lowered to the lowermost position permitted by the lower extremities of the jaws, the jaws are opened by the pair of small gears 39 being cammed to rotate through an arc. With the jaws open, the container 11 having the sleeve 42 mounted on an upper region in free-standing relation is then loosely held in container-receiving pocket 18 adapted to be further rotated around turret 12.

Another turret 70 comprising a starwheel is mounted closely adjacent and tangential to main turret 12 in a region where the jaws 36 and 37 are maintained in open position. The turret 70 carries a plurality of second flat, circular alignment plates 71 which serve to further lower the sleeve 42 onto the container neck 11b in final arrangement. Each of the plates 71 is mounted on a reciprocatable vertical support rod 72 which has a roller cam 73 attached to an upper region which is moved in contact with a circular cam track 74 at the top of turret 70. When the turret 70 is rotated by gear 29 interconnected to main gear 24 on turret 12, the plates 71 are moved downwardly when in tangential relation to turret 12 as the containers 11 are moved thereby in pockets 18. The containers are then moved onto turret 70 which constitutes the outgoing starwheel of the machine. The sleeve 42 is further lowered by plates 71 from its free-standing position to be held by friction on the container neck in precise axial alignment for heat-shrinking thereon in another operation.

The containers 11 having sleeves 42 mounted temporarily thereon are then moved back onto conveyor 14 by turret 70 for further transport to a heat-shrinking operation. Depending upon the selection of thermoplastic sheet material for sleeve 42, the containers and sleeves are passed through a tunnel oven (not shown) having a temperature ranging from about 170° to 800° F. The sleeves then rapidly shrink and conform to the surface areas therebeneath in tightly-fitting arrangement.

The main turret 12 of the machine is adapted to receive and handle containers 11 at a wide variety of speeds of operation. At all speeds, the incoming starwheel is adapted to deliver containers serially into the container-receiving pockets 18 by their intermeshing with recesses 17a. The sleeve delivery wheel 40 is adapted to deliver an individual sleeve 42 at the chucking device 35 at all such speeds. The outgoing starwheel 70 is adapted to receive and finally align the free-standing sleeve 42 on each container prior to its return to conveyor 14 and heat shrinking of the sleeve in place on the container.

Various modifications may be resorted to within the spirit and scope of the present invention as defined in the appended claims.

I claim:

1. Combined apparatus for assemblying tubular, heat-shrinkable thermoplastic sleeves having opposing fold lines telescopically onto hollow containers comprising a rotary turret having a plurality of container-receiving pockets thereon, means to deliver serially individual containers to each of said pockets, holding means for retaining a plurality of tubular sleeves in flattened condition nested in a stack, means for serially removing the outermost sleeve from said stack one at a time, delivery means for moving the individual sleeve into axial alignment with a container retained in said container-receiving pocket, a pair of reciprocatable partible jaws mounted on each of said container-receiving pockets, means to reciprocate said jaws to enclose an upper region of said container and simultaneously fully open an individual sleeve by compressing the same at its fold lines while axially aligning the two components, first telescoping means to effect at least partial telescopic relative movement of said sleeve and said container while retained by said jaws, said jaws acting as guides for the movement of said sleeve and container and second telescoping means to precisely position said sleeve on said container subsequent to its release by said jaws and prior to subjecting said sleeve and container to appropriate physical conditions to shrink the sleeve tightly in place on said container.

2. Combined apparatus in accordance with claim 1 wherein said means for serially removing the said outermost sleeve from said stack comprises a plurality of vacuum heads adapted to engage and deliver by said delivery means individual sleeves to each of said jaw pairs for fully opening said individual sleeve and obtaining axial alignment with a prescribed container.

3. Combined apparatus in accordance with claim 1 wherein said pairs of partible jaws are adapted to partially engage an intermediate area of the container neck and the fold lines of said tubular sleeve for opening the latter, and said first telescoping means being adapted to at least partially telescope said sleeve over said container while the latter is retained by said pair of partible jaws.

4. Combined apparatus in accordance with claim 1 wherein said first and second telescoping means comprise reciprocatable alignment plates adapted to contact an upper region of a tubular sleeve to lower the same telescopically stepwise into precise axial alignment with said container.

5. Combined apparatus in accordance with claim 2 including a second set of vacuum heads mounted in reciprocatable position immediately adjacent and above each of said pairs of partible jaws to extend an individual sleeve into at least partially-opened relation with one of said first set of vacuum heads prior to its being contacted and fully opened by said jaw pairs.

6. Combined apparatus in accordance with claim 1 wherein said sleeve is comprised of relatively-rigid foamed polystyrene sheet material which is flat-folded into a tubular preform.

7. An improved apparatus for applying heat-shrinkable complementary tubular bands to the necks of containers comprising a first rotary turret having a plurality of container-receiving pockets thereon in equi-spaced arrangement, delivery means adapted to deliver individual containers in spaced-apart relation to said container-receiving pockets of said turret, retention means for retaining a stack of flattened tubular bands nested with an open end lowermost, first vacuum means for serially removing the outermost band from said retention means and delivering same to a tangential position above an individual container retained in a container-receiving pocket, second vacuum means mounted in axial alignment with said container-receiving pocket on said turret to at least partially open said band when said first and second vacuum means are juxtaposed in near facing alignment, a pair of partible jaw members having concave cylindrical opposing surfaces mounted at each container-receiving pocket adapted to engage an intermediate neck area of the container and simultaneously contacting said band to fully open the same above said container with the two components in axial alignment, a first reciprocatable head mounted over each of said container-receiving pockets for urging said band telescopically downwardly over the container neck retained therebelow by said jaws in said container-receiving pocket, said jaws acting as guides for the movement of said band onto said container each said container-receiving pocket retaining said container with said band at least partially telescoped over the upper neck region of said container while being held by said jaws on said first rotary turret, and a second reciprocatable head for urging said band further telescopically downwardly into precise position following release of said container by said pair of partible jaw members.

8. An improved apparatus in accordance with claim 7 wherein each said pair of partible jaws is pivotally mounted having matching concave cylindrical internal surfaces at least partially complemental to the diameter of said tubular band in fully open arrangement and to an intermediate neck area of lesser diameter of said container when said jaws are in their closed position.

9. An improved apparatus in accordance with claim 7 including means to prevent removal of a tubular band from said band retention means by said first vacuum means when said container-receiving pocket is devoid of a container.

10. An improved apparatus in accordance with claim 7 wherein said first vacuum means comprises a secondary rotary wheel mounted in tangential relation to said first rotary turret and having a series of spaced-apart vacuum heads thereon adapted to interact in timed relation with the plurality of spaced-apart jaw pairs at said container-receiving pockets on said first rotary turret.

11. An improved apparatus in accordance with claim 7 wherein said retention means for guiding a stack of flattened tubular bands in nested relation comprises a hollow holder complemental to the dimensions of said bands and adapted to retain a substantial number of bands mounted with an open end lowermost facing said first vacuum means for individual removal thereby.

12. An improved apparatus in accordance with claim 7 wherein said pairs of partible jaws are adapted to simultaneous physical engagement around prescribed areas of both said container neck and said tubular band, and means mounted on said first rotary turret to open and close said partible jaws to attain axial alignment of said tubular band and container neck when in the closed position.

13. An improved apparatus in accordance with claim 7 wherein said first reciprocatable head mounted over each of said container-receiving pockets comprises a flat surface arranged normal to the band axis for urging said band telescopically downwardly over an individual container.

14. An improved apparatus in accordance with claim 7 including an additional retention means for retaining said container with said band at least partially telescoped thereover and which comprises a secondary rotary wheel, and a plurality of second reciprocatable heads mounted in spaced relation on said secondary rotary wheel for urging said band telescopically downwardly into precise alignment on said container.

15. An improved apparatus in accordance with claim 10 wherein the series of vacuum heads on said first rotary wheel have camming means to permit extended dwell time of each vacuum head of said first vacuum means when juxtaposed adjacent the outermost band retained by said retention means for said stack of flattened tubular bands.

16. The method of assemblying heat-shrinkable tubular bands on the neck portion of containers comprising the steps of delivering serially to a rotary turret machine individual containers in upright spaced-apart relation, positioning each of said containers within a container-receiving pocket for movement at least partially around said rotary turret machine, retaining a substantial number of said tubular bands in flattened, nested condition in a suitable holder with one open end lowermost, delivering an individual tubular band to a tangential position above said container retained within said pockets on said rotary turret machine, engaging said container at an upper neck region by a pair of partible pivoted jaws located above an in alignment with said pocket and simultaneously contacting said band thereby fully opening the same above said container by engagement of said band by said jaws while moving the band into axial alignment with said container, moving said band telescopically downwardly to surround at least a portion of the container neck while retained by said jaws therebelow, said jaws acting as guides for the movement of said band onto said container disengaging said jaws from contact with said container neck and said band, and moving said band telescopically further downwardly into precise alignment on said container neck for subsequent heat-shrinking in place thereon.

17. The method in accordance with claim 16, including the steps of delivering said tubular band from said holder to a position above said container in timed relation by a first vacuum head adapted to move through an arc between such pick-up and delivery positions.

18. The method in accordance with claim 16, including the step of partially opening said tubular band by a second juxtaposed vacuum head mounted in reciprocatable position above said pair of partible jaws at said container-receiving pocket.

19. The method in accordance with claim 16, including the step of utilizing relatively-stiff, foamed polystyrene sheet material which is flat folded into two-ply relation as the heat-shrinkable tubular band, and fully opening said band by closing said partible pivoted jaws and thereby contacting and compressing the fold lines of said tubular band.

20. The method in accordance with claim 16, including the step of determining when a container is to be received within a container-receiving pocket and permitting delivery of a tubular band only when said container is present therein.

21. The method in accordance with claim 16, including the step of at least partially opening said tubular band with a juxtaposed pair of vacuum heads at least temporarily disposed over said container and more fully opening said band by said jaws compressing same at its fold lines.

22. The method in accordance with claim 16, including the step of engaging serially a number of tubular bands by a plurality of first vacuum heads mounted on a rotary wheel device adapted to rotate in timed relation and tangential to said rotary machine having a plurality of container-receiving pockets thereon, and delivering one tubular band into axial alignment with an individual container in said pocket during its arcuate movement.

23. The method in accordance with claim 16, including the step of moving said tubular band downwardly into telescopic engagement with the container neck in two stages, the first stage while the said container neck and said tubular band are retained in axial alignment by contact with said pair of partible pivoted jaws and the second stage following release of said container neck and said band from contact with said pair of jaws while the band is free-standing on said container neck.

24. The method in accordance with claim 23, including the step of moving said tubular band downwardly stepwise into telescopic engagement with the container neck by a primary reciprocatable flat surface mounted normal to the band axis and operable from above during said first stage, and by a secondary reciprocatable flat surface mounted and operable similarly during said second stage.

25. The method in accordance with claim 23 wherein said band has a diameter closely complemental to said container neck for a slip fit and frictional retention thereon, thus being alignable in final position without further support or slippage prior to heat shrinking thereon.

* * * * *